United States Patent
Rackham

(10) Patent No.: US 10,311,292 B2
(45) Date of Patent: Jun. 4, 2019

(54) MULTIPLE-MEDIA PERFORMANCE MECHANISM

(71) Applicant: Guy Jonathan James Rackham, Brooklyn, NY (US)

(72) Inventor: Guy Jonathan James Rackham, Brooklyn, NY (US)

( * ) Notice: Subject to any disclaimer, the term of this patent is extended or adjusted under 35 U.S.C. 154(b) by 0 days.

(21) Appl. No.: 14/922,694

(22) Filed: Oct. 26, 2015

(65) Prior Publication Data

US 2016/0117838 A1    Apr. 28, 2016

Related U.S. Application Data

(60) Provisional application No. 62/068,167, filed on Oct. 24, 2014.

(51) Int. Cl.
*G06K 9/00*    (2006.01)

(52) U.S. Cl.
CPC ...... *G06K 9/00335* (2013.01); *G06K 9/00711* (2013.01); *G06K 9/00718* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,790,124 A | * | 8/1998 | Fischer | G06T 15/10 345/473 |
| 6,386,985 B1 | * | 5/2002 | Rackham | A63J 1/00 472/75 |
| 6,535,269 B2 | * | 3/2003 | Sherman | G03B 31/00 352/6 |
| 6,696,631 B2 | * | 2/2004 | Smith | G10H 1/0058 84/601 |
| 7,225,414 B1 | * | 5/2007 | Sharma | G06F 3/012 715/862 |
| 7,852,348 B2 | | 12/2010 | Rackham | |
| 7,876,331 B2 | | 1/2011 | Rackham | |
| 8,456,487 B2 | | 6/2013 | Rackham | |
| 2005/0113703 A1 | * | 5/2005 | Farringdon | A61B 5/0428 600/509 |

* cited by examiner

*Primary Examiner* — Dwayne D Bost
*Assistant Examiner* — Tsung Yin Tsai
(74) *Attorney, Agent, or Firm* — Katten Muchin Rosenman LLP

(57) ABSTRACT

Embodiments of a system and method are disclosed for adjusting the execution of a multi-media performance in response to a live performance. Embodiments track and receive data regarding elements of the live performance, analyze the live performance data, determine the pace of the live performance, and use this data to appropriately execute elements of the accompanying multi-media performance. Some embodiments may perform this analysis and adjustment automatically. Certain embodiments may use voice detection devices, motion detection devices and musical detection devices to track the live performance. The live performance may be analyzed in relation to an electronic script, which may contain instructions related to the execution of the multi-media elements.

20 Claims, 3 Drawing Sheets

MULTIPLE-MEDIA PERFORMANCE MECHANISM

This application claims the priority of U.S. Provisional Application Ser. No. 62/068,167 filed Oct. 24, 2014, the entirety of which is hereby incorporated by reference.

FIELD

Embodiments described herein are employed for performances or presentations. More particularly, embodiments relate to apparatus and methods for enhancing a performance or presentation with electronic, mechanical or other multi-media elements.

BACKGROUND

The image of live actors interacting with animated or prerecorded images and sound is commonplace. In film or television, the coordination between the various images and sounds is largely achieved in the editing room, or as the result of repeated rehearsal until the timing of the combined performance is exact. In such cases, the combined image is recorded and, therefore, each viewing is identical. With pre-recorded images, unfortunately, there is no mechanism to adjust the flow of the presentation to allow for variations in the performance or the audience response. All aspects of the performance are predetermined and therefore the presentation is passive to the audience's reaction. The use of pre-recorded audio and visual material in live performance is also commonplace in theatre, music, and business presentations. Again, however, there are significant limitations with the ability to manipulate the pre-recorded material and electronic media in coordination with the live performance.

Visuals effects, sounds and other media can be linked together, but such synchronization capabilities are currently limited and typically include significant manual intervention. For example, a technician may, in response to some aspect of a live performance, manually trigger video, sound and lighting changes together. Once triggered, the various effects typically run for a fixed time.

It is therefore necessary for the performers to have rehearsed their timing exactly and for the related media and control signals to have been pre-recorded and matched together exactly. For instance, once an actor has embarked on a dialogue in such circumstances, there is no mechanism to adjust the pace and/or timing of other media employed concurrently in response to variations in the actor's performance or the audience's response. Accordingly, it is believed that the use of pre-recorded media in live performance has been restricted to highly rehearsed and short sequences. What is needed is a system and method of controlling multi-media presentation elements which accounts for variations in live performance.

SUMMARY

Embodiments include a computer mechanism that combines an integrated electronic or computer-based script that defines confluences between live action and multiple media that are used in many types of scripted or other predetermined performance (e.g., concert, theater, commercial presentation) and different performance tracking devices. An important feature of the embodiments described herein is the property of the electronic script to allow for different stagings of the performance that follow the script to have the inevitable variations in timing and pace associated with live performance. Despite such changes in timing and pace (and optionally allowed paths) the script ensures that the relative coordination between the different threads of live activity and the execution of the various media devices is synchronized.

In embodiments, the performance tracking devices monitor and interpret aspects of the staging of a performance and the computer mechanism constantly performs automated analysis during a performance to be able to adjust the pace, timing and/or direction of the scripted execution of the media displays and media devices so that such displays and devices, and the execution thereof, remain in synchronization with presenter, performer, actor, etc. behavior as observed.

Disclosed is a computer implemented method for controlling a multi-media performance which comprises the steps of tracking a live performance activity utilizing one or more performance tracking devices, receiving data from the live performance activity from the one or more performance tracking devices, analyzing the live performance activity data, determining the pace of the live performance activity based on the analyzing and adjusting the timing of at least one multi-media device execution based on the pace of the live performance activity.

Also disclosed is a system for controlling elements of a multi-media performance in response to a live performance. The system comprises at least one electronic script, at least one multi-media device, at least one performance tracking device, at least one device controller capable of triggering multi-media performance elements and a processor. The processor is operably connected to both a performance tracking device and at least one multi-media device. The processor is capable of adjusting the execution of multi-media performance elements based on input from the electronic script and the performance tracking device.

Disclosed embodiments track and react to a live performance in a previously unknown way. Related devices in the field enabled a performance director to track multiple threads of a performance and manually execute various multi-media aspects associated with the performance. In some previously known devices, a series of pre-recorded or otherwise automated events could be used to trigger a succession of other automated events. Currently disclosed embodiments allow for the execution of multi-media elements to be adjusted in response to a live performance event. Certain embodiments may allow for automatic and/or computer implemented adjustment of the execution of multi-media elements in response to a live performance event.

DETAILED DESCRIPTION

Figure 1:
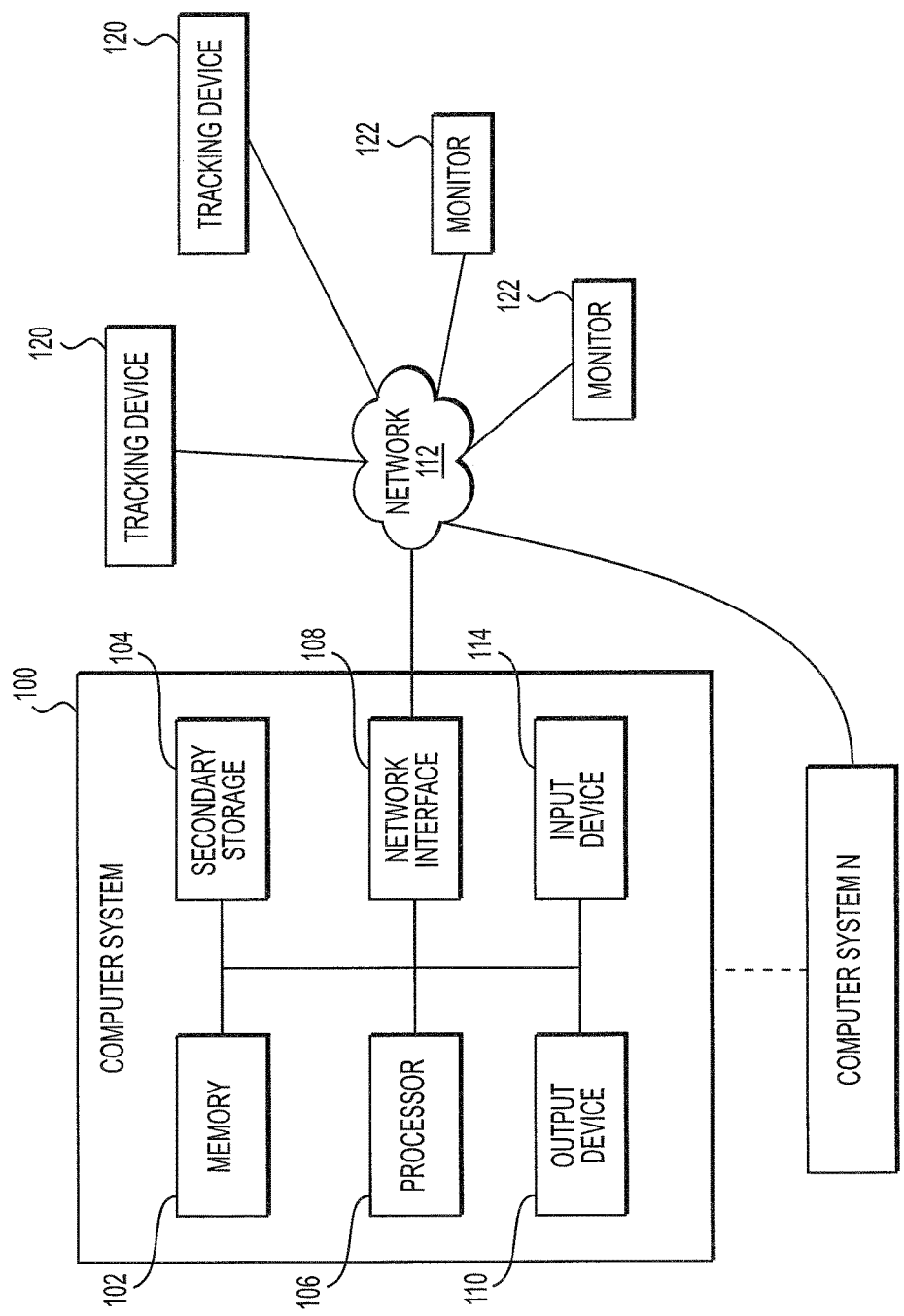
FIG. 1 is a block diagram of an embodiment of a system for monitoring a performance and adjusting multi-media elements related to the performance.

Multiple media are increasingly used in all types of live events to enhance the audience experience. Media include projected (including interactive displays) scenery and backdrops, lighting, immersive sound and mobile stage devices.

Careful timing and close coordination is needed to ensure that the different media is synchronized with each other and with the performers each time the event is staged, taking into account the inevitable variations in timing and pace between performances. The current problem is that this complex media management is handled manually, by one or more individuals playing the role of a performance director that observes the action and controls the execution of the different media devices in concert.

Applicant is an inventor on a number of related patents that describe earlier inventions that address problems described herein. The present application is directed at novel improvements to those inventions. The patents include U.S. Pat. Nos. 6,386,985, 7,852,348, 7,876,331 and. 8,456,487, 985, all entitled "Virtual Staging Apparatus and Method" and all herein incorporated by reference.

Different types of preconfigured electronic media control scripts and device controllers can be used to assist one or more 'performance directors' as they coordinate with the overall performance-triggering actions (perhaps selecting different paths through the script), speeding up and slowing down the media execution to track with the observed live performance. Even with these controls, it is still the critical role of the performance director to observe and interpret the live action to manage the execution of the media content. This dependency on manual intervention and control limits the extent to which media can be practically integrated into live performance.

Described herein are embodiments of a system and method that provide a computer mechanism that combines an integrated electronic or computer-based script that defines confluences between live action and multiple media that are used in many types of scripted or other pre-determined performance (e.g., concert, theater, commercial presentation) and different performance tracking devices. Performance tracking devices may include, but are not limited to, motion tracking devices, musical tracking devices, visual tracking devices, sound effect tracking devices, facial recognition devices, voice recognition devices and other tracking devices known in the art. Embodiments overcome the above-described problems and disadvantages of the prior art.

A combination of the intended media representations and the live action of the presenters, performers, actors, etc., may be specified collectively in an integrated 'script' that defines how the streams of activity (actors and media) combine to create the overall multi-media presentation experience. Importantly desired confluences between the threads of different media ("media threads") and threads of live activity ("live activity threads") captured in the script are stable even though there can be variations in the precise timing and pace from one staging of the performance to another. For example, if live action progresses slightly faster for one performance, all of the media threads will need to similarly execute slightly faster so that relative to each other everything (the media and live activity) remains synchronized. The electronic script captures these relative coordination dependencies.

Embodiments exploit the pattern of confluence between the different threads of the integrated performance as it is captured in the script. The script includes a schedule of execution and timing that represents the normal or desired execution and adjustments for any particular staging performance can be made against this default schedule as a baseline. Rather than have a performance director observe the action and manually coordinate execution, embodiments utilize tracking devices to monitor one or more threads of the live performance. For example, voice recognition devices may track dialogue against the intended script, music may be matched to the score and beat, face recognition and motion detection devices may be used to monitor the blocking and movements of the performers.

These monitored activities may be mapped (e.g., using suitable computer technology known to those of ordinary skill in the art) to determine the actual pace of the performance (typically as compared against a default pace). Embodiments may then use the determined actual pace of the performance and activity measurement and subsequent analysis to adjust the execution of the overall performance script, making changes to the pace, timing and even direction of the execution of the media threads to match the tracked behaviors. In doing so the computer mechanism acts as an automated performance director.

In combination, the multi-media devices, the integrated script, the tracking mechanisms and the analysis of the automated performance director combine to create an environment where a repeating or scripted performance may be staged and where the actors, performers, etc. have the freedom to perform responsive to the 'live' event and audience reaction each time and have the different media that support the performance react appropriately to their actions to maintain the overall integrated, automated multi-media effect.

In embodiments, the analysis of the monitored activities may combine inputs from many tracking devices and use different types of approaches to most sensibly interpret the data. Such approaches may include fuzzy logic, pattern detection and correlation analysis. The media controls driven from the script need to support instructions that may start or pause, speed up, slow down and even select between directions or paths for the controlled media to remain in overall synchronization. In order to avoid sudden changes, the analysis may track the performance pace over an extended period to detect more general behavior patterns. The pace changes may be immediate, or may be gradual, re-establishing 'full' synchronization incrementally or to re-align at some future point in the script if the performance script allows.

Embodiments may fully automate the performance director role and the control and synchronization of the multi-media devices. However, embodiments need not fully automate the performance director role. Rather, embodiments may provide guidance to one or more human performance directors, or the human performance director may monitor and override automated execution recommendations of the computer mechanism. Furthermore, the analysis of activity can include thresholds that ensure that timing variations are interpreted within some reasonable range so that unexpected events do not result in excessive changes to execution.

The emphasis of the discussion herein is on live performances performed in front of a live audience. It should be understood, however, that the performances and live performances described herein may be performed as an online, networked (e.g., the internet) and/or virtual live performance that is streamed, multicast, unicast, broadcast and/or otherwise transmitted with the audience viewing the performance through networked computing or display devices (e.g., smartphones, tablets, monitors, computers, networked televisions, closed-circuit viewings, etc.). The performers may be performing on a stage or set remote from the audience and/or performance director. Such stage or set may be only viewable through networked computing or display devices. Similarly, a live performance in front of a live audience may be simultaneously streamed, multicast, unicast, broadcast, transmitted or otherwise made viewable over one or more networks.

With reference now to FIG. 1, shown is a block diagram illustrating exemplary components of a computer mechanism 100. Computer mechanism 100 may include and execute one or more sub-system components to perform functions described herein, including steps of methods/processes described above. Computer mechanism 100 may connect with a network 112, e.g., an Ethernet, Internet, or other network, to obtain and transmit data and information, as well as to transmit controls and commands to multi-media devices as described above. Computer mechanism 100 may receive data, either directly or through a network 112, from tracking devices 120. In certain embodiments, computer mechanism 100 may also output data using monitors 122 or other audio/visual devices to inform the performance director or performers of changes to the script, pace or otherwise made to the performance based on the operations of the method described herein. For example, the monitors 122 may display the script and scroll through the script, tracking with the performance. Monitors 122 may be positioned at various positions where the performers and performance director can view them (e.g., on a stage facing away from the audience, behind or above the audience, off the side of the stage, etc.).

Computer mechanism 100 typically includes a memory 102, a secondary storage device 104, a processor 106 and an input device 114. Computer mechanism 100 may also include a plurality of processors 106 and be configured as a plurality of, e.g., bladed servers, or other known server configurations. Computer mechanism 100 may also include an output device 110. Memory 102 may include RAM or similar types of memory, and it may store one or more applications for execution by processor 106. Secondary storage device 104 may include a hard disk drive, CD-ROM drive, or other types of non-volatile data storage. Memory 102 and secondary storage 104 are computer-readable media that may include instructions for controlling a computer system, such as Computer mechanism 100, and a processor, such as processor 306, to perform a particular method, such as methods and processes described herein. Input device 114 allows the performance director or other operator of system and method to input changes, to select tracking devices to use/rely upon, or to otherwise interact with system and method as described herein. Embodiments of computer mechanism 100 may contain multiple input devices 114 such as a mouse, keyboard, voice control, touch screen, scanner, video recorder, audio recorder or control panel that allow the director to manually adjust the timing, pace and execution of various multi-media elements of a performance. The director may adjust individual multi-media elements, a combination of elements or the all multi-media elements of a thread or performance. These adjustments may be made separately or simultaneously.

Processor 106 executes the application(s), such as sub-system component, which are stored in memory 102 or secondary storage 104, or received from the Internet or other network 112. The processing by processor 106 may be implemented in software, such as software modules, for execution by computers or other machines. These applications preferably include instructions executable to perform the system and subsystem component functions and methods described above and illustrated in the figures herein. The applications preferably provide graphical user interfaces (GUIs) through which users may view and interact with sub-system components.

Also, as noted, processor 106 may execute one or more software applications in order to provide the functions described in this specification, specifically to execute and perform the steps and functions in the methods described above. Such methods and the processing may be implemented in software, such as software modules, for execution by computers or other machines. In an embodiment, processor 106 may be a multi-core processor, such as an Intel Xeon processor with four (4) cores. Modules implementing sub-system components may be implemented in C++ and be multi-threaded to take advantage of the multiple cores available in the processor 106. Output devices 110 may include any type of output device, such as a display, speakers, etc. These output devices 110 may display the results of tracking and analysis as well as a script for the director to monitor and adjust. Embodiments of computer mechanism 100 may also include monitors, displays, speakers or other audio/visual devices 122 for informing the performers of the live performance. A monitor or teleprompter 122 may be configured to display the electronic script to performers who are either on or off stage. The electronic script may be separated so that each performer receives data most important to his particular performance. Computer mechanism 100 connects to network 112 via network interface 108.

Figure 2:
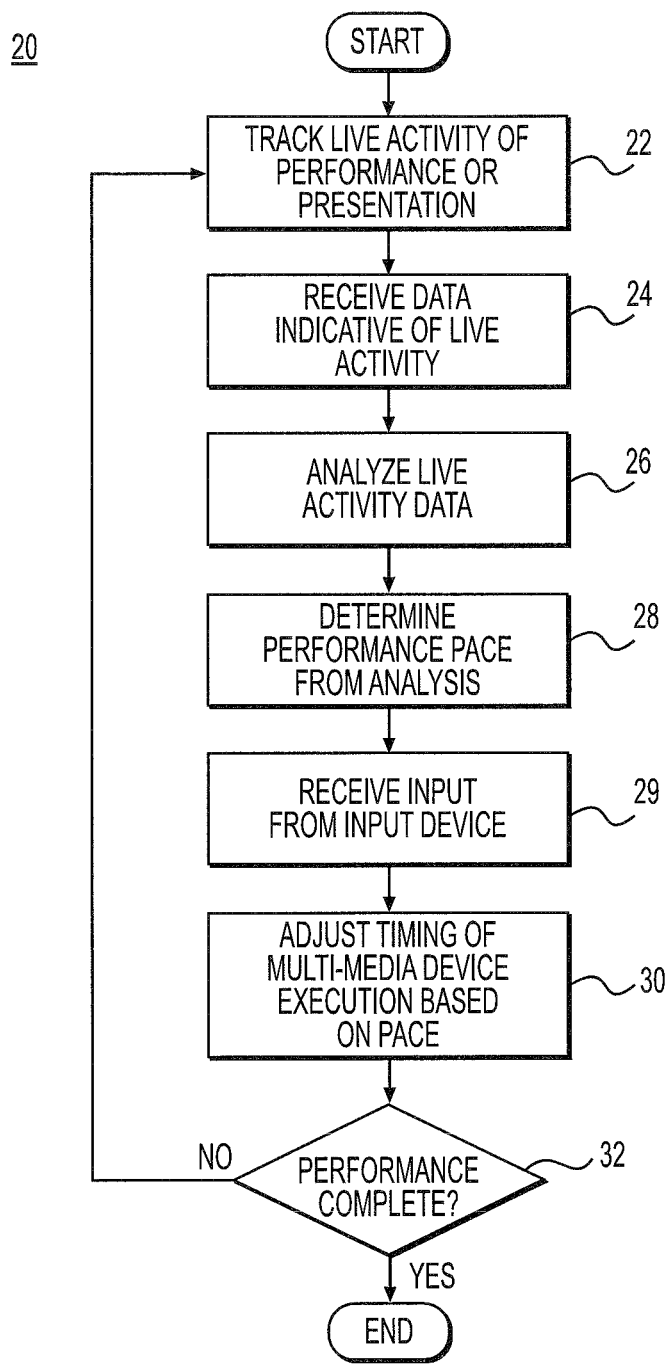
FIG. 2 shows an embodiment of a method for monitoring aspects of a performance and adjusting a multi-media presentation.

With reference now to FIG. 2, shown is a flow diagram illustrating an embodiment of a method 20 for multi-media device performance control, which may be executed by computer mechanism. Method 20 may track live activity of a performance or presentation with one or more tracking device, block 22, and receive data indicative of live activity from the one or more tracking devices, block 24. Method 20 may analyze the received live activity data, block 26. From the live activity data, which is described above and may be received from performance tracking devices, method 20 may determine the performance pace, block 28. Method 20 may receive input from input device 114, block 29. Based on the determined performance pace, method 20 may adjust the timing of multi-media device execution, block 30, as described above. For example, method 20 may accelerate or decelerate the multi-media device execution, omit or add different multi-media device actions, speed up the execution pace of the electronic script or make other changes to the performance. Method 20 adjusts the execution based on the correlation and dependencies as described in the script. Method 20 determines if the performance continues, block 32, and continuously repeats until the performance ends or method 20 is terminated.

Figure 3:
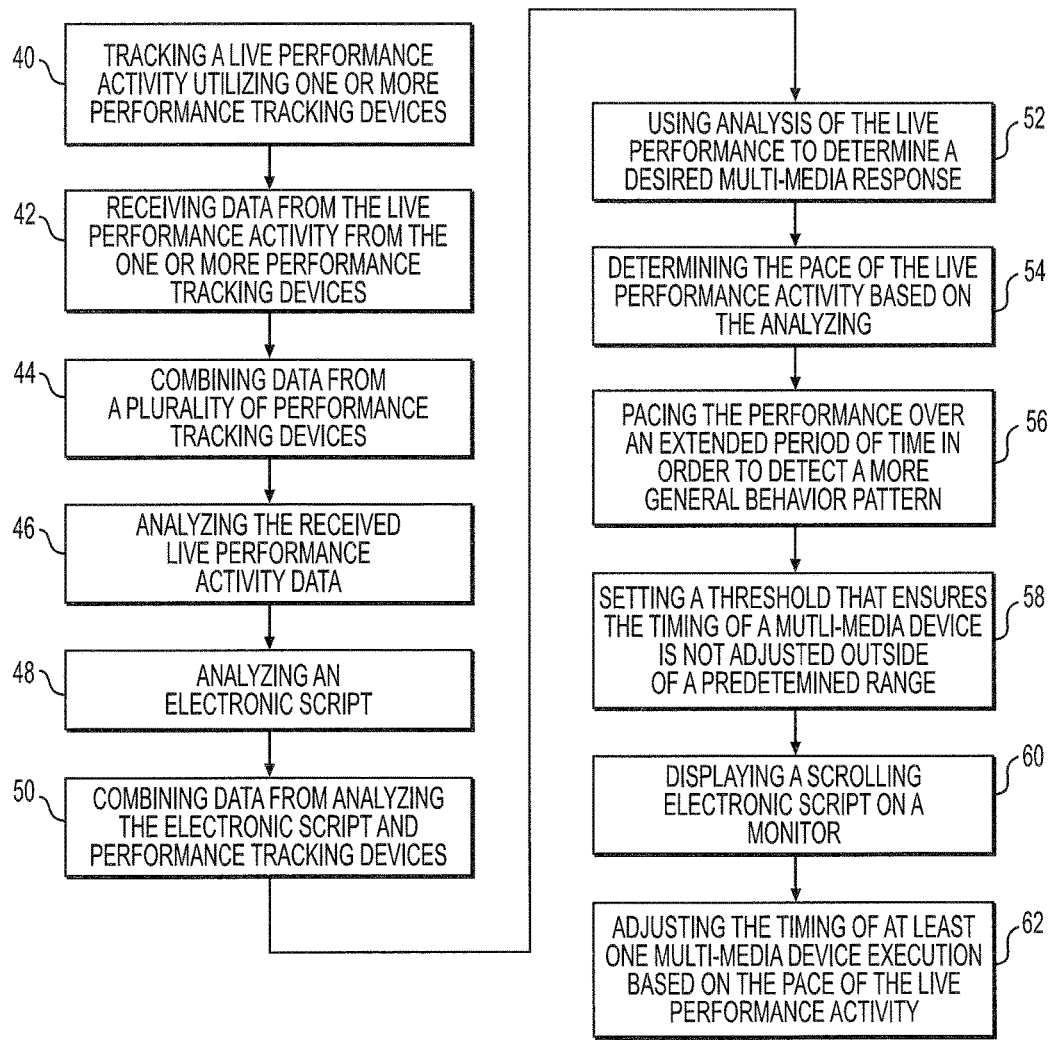
FIG. 3 shows an embodiment of a method for monitoring aspects of a performance and adjusting a multi-media presentation.

With reference now to FIG. 3, shown is a flow diagram illustrating an alternative embodiment of a method 38 for multi-media device performance control, which may be executed by a computer mechanism. Method 38 may include tracking a live performance activity utilizing one or more performance tracking devices, block 40. It may also include receiving data from the live performance activity from the one or more performance tracking devices, block 42. Method 38 may include combining data from a plurality of performance tracking devices, block 44, and analyzing the received live performance activity data, block 46. Method 38 may analyze an electronic script, block 48, and combine data from analyzing the electronic script and performance tracking devices, block 50. The method may include using analysis of the live performance to determine a desired multi-media response, block 52, and determining the pace of the live performance activity based on the analyzing, block 54. Additionally, method 38 may include pacing the performance over an extended period of time in order to detect a more general behavior pattern, block 56, setting a threshold that ensures the timing of a multi-media device is not adjusted outside of a predetermined range, block 58, displaying a scrolling electronic script on a monitor, block 60 and adjusting the timing of at least one multi-media device execution based on the pace of the live performance activity, block 62.

Disclosed embodiments relate to a computer implemented method for controlling a multi-media performance. Such a method may be implemented by a computer system such as is illustrated in FIG. 1. The method includes tracking a live performance activity utilizing one or more performance tracking devices, receiving data from the live performance activity from the one or more performance tracking devices, analyzing the live performance activity data, determining the pace of the live performance activity based on the analyzing and adjusting the timing of at least one multi-media device execution based on the pace of the live performance activity.

Certain embodiments also include analyzing an electronic script. Embodiments may also include combining data separated from analyzing the electronic script and performance tracking devices in order to adjust the timing of the execution of the at least one multi-media device. The live performance may be paced over an extended period of time in order to detect a more general behavior pattern. Analysis of the live performance may be used to determine a desired multi-media response. The performance tracking devices may include a vocal recognition device. The tracking of the live performance may include using a vocal recognition device. The tracking may also include combining data from a plurality of tracking devices to determine the pace of the live performance. The analyzing of the live performance activity data may include setting a threshold that ensures the timing of a multi-media device is not adjusted outside of a pre-determined range. The method may also include displaying a scrolling electronic script on a monitor. The adjusting step may include slowing down a speed at which the electronic script is scrolled.

Alternative embodiments may relate to a system for controlling elements of a multi-media performance in response to a live performance. The system may include at least one electronic script, at least one multi-media device, at least one performance tracking device, at least one device controller capable of triggering multi-media performance elements and a processor. The processor is operably connected to both a performance tracking device and a multi-media device. The processor is capable of adjusting the execution of multi-media performance elements based on input from the electronic script and the performance tracking device.

In certain embodiments, the performance tracking devices may include vocal recognition devices, facial recognition devices, motion detection devices or music detection devices. Multi-media performance elements may include stage lighting, musical tracks, sound effects, visual effects, wind machines or smoke machines.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A computer-implemented method for controlling a multi-media performance, the method comprising:

tracking a live performance activity, wherein one or more performance tracking devices track the live performance activity by monitoring one or more threads included in the live performance activity;

receiving live performance activity data output from the one or more performance tracking devices;

analyzing the received live performance activity data;

determining pace of the live performance activity based on the received live performance activity data and an electronic script that defines confluences between the live performance activity and the multi-media performance of at least one multi-media device; and adjusting timing of execution of the multi-media performance of the at least one multi-media device based on the pace of the live performance activity.

2. The method of claim 1, further comprising analyzing the electronic script.

3. The method of claim 2, wherein the adjusting the timing includes combining data from the analyzing the electronic script and performance tracking devices in order to adjust the timing of the execution of the at least one multi-media device.

4. The method of claim 1, wherein the performance is paced over an extended period of time in order to detect a more general behavior pattern.

5. The method of claim 1, further comprising using analysis of the live performance activity data to determine a desired multi-media response.

6. The method of claim 1, wherein the one or more performance tracking devices include a vocal recognition device.

7. The method of claim 6, wherein the tracking a live performance activity includes using vocal recognition device.

8. The method of claim 1, wherein the tracking includes combining data from a plurality of performance tracking devices to determine the pace of the live performance activity.

9. The method of claim 1 wherein the method further includes displaying a scrolling electronic script on a monitor and the adjusting includes slowing down a speed at which the electronic script is scrolled.

10. The method of claim 1, wherein the analyzing the live performance activity data includes setting a threshold that ensures the timing of the at least one multi-media device is not adjusted outside of a predetermined range.

11. The method of claim 1, wherein the one or more threads included in the live performance activity include one or more selected from the group consisting of dialogue against intended script, score of music, beat of music, blocking of performers, and movements of performers.

12. The method of claim 1, wherein said determining the pace of the live performance activity comprises mapping the live performance activity data to a default pace of the electronic script.

13. The method of claim 1, wherein the electronic script defines how streams of the live performance activity and the multi-media performance combine to create overall multi-media presentation experience.

14. A system for controlling elements of a multi-media performance in response to a live performance, the system comprising:

at least one multi-media device;

at least one electronic script that defines confluences between the live performance and multi-media performance of the at least one multi-media device;

at least one performance tracking device that tracks the live performance by monitoring one or more threads included in the live performance, wherein the at least one performance tracking device outputs live performance data;

at least one device controller capable of triggering multi-media performance elements; and a processor operably connected to the at least one performance tracking device and at least one multi-media device, wherein the processor receives the live performance data from the at least one performance tracking device, and determines pace of the live performance based on the received live performance data and the at least one electronic script, and wherein the processor is capable of adjusting execution of the multi-media performance elements based on the pace of the live performance.

15. The system of claim 14, wherein the at least one performance tracking device comprises a voice recognition device, facial recognition device, motion detection device or music detection device.

16. The system of claim 14, wherein the multi-media performance elements comprise stage lighting, musical tracks, sound effects, visual effects, wind machines, or smoke machines.

17. The system of claim 14, wherein the processor analyzes the live performance data, and sets a threshold that ensures the timing of the at least one multi-media device is not adjusted outside of a predetermined range.

18. The system of claim 14, wherein the one or more threads included in the live performance include one or more selected from the group consisting of dialogue against intended script, score of music, beat of music, blocking of performers, and movements of performers.

19. The system of claim 14, wherein the processor maps the live performance data to a default pace of the at least one electronic script to determine the pace of the live performance.

20. The system of claim 14, wherein the electronic script defines how streams of the live performance and the multi-media performance combine to create overall multi-media presentation experience.

* * * * *